United States Patent
Kusume et al.

(10) Patent No.: US 8,268,215 B2
(45) Date of Patent: *Sep. 18, 2012

(54) LAMINATED FILM FOR REFLECTION PLATE

(75) Inventors: Hiroshi Kusume, Gifu (JP); Atsushi Oyamatsu, Gifu (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 769 days.

This patent is subject to a terminal disclaimer.

(21) Appl. No.: 11/629,858

(22) PCT Filed: Jun. 16, 2005

(86) PCT No.: PCT/JP2005/011489
§ 371 (c)(1),
(2), (4) Date: Dec. 18, 2006

(87) PCT Pub. No.: WO2005/123385
PCT Pub. Date: Dec. 29, 2005

(65) Prior Publication Data
US 2009/0035544 A1    Feb. 5, 2009

(30) Foreign Application Priority Data
Jun. 17, 2004   (JP) .................. 2004-179388

(51) Int. Cl.
B29C 55/00 (2006.01)
B29C 55/10 (2006.01)
B29C 55/12 (2006.01)
B32B 27/20 (2006.01)
B32B 27/36 (2006.01)

(52) U.S. Cl. .............. 264/235.8; 264/280; 264/288.4; 264/289.6; 264/290.2; 264/210.1; 264/210.2; 264/210.7; 264/177.1; 264/177.19; 264/232; 264/234; 264/235; 264/235.6; 428/1.1; 428/212; 428/213; 428/215; 428/216; 428/323; 428/480; 428/910; 362/296.01; 362/296.02; 362/311.01; 362/311.03; 362/311.04; 362/341; 362/603; 362/609; 362/615; 362/623; 362/624; 362/627; 362/629

(58) Field of Classification Search ............. None
See application file for complete search history.

(56) References Cited

U.S. PATENT DOCUMENTS

| | | | |
|---|---|---|---|
| 4,119,614 A * | 10/1978 | King et al. | 528/283 |
| 4,138,364 A * | 2/1979 | King et al. | 502/164 |
| 4,208,527 A * | 6/1980 | Horlbeck et al. | 528/279 |
| 4,763,133 A * | 8/1988 | Takemura et al. | 343/912 |
| 5,041,525 A * | 8/1991 | Jackson | 528/272 |
| 5,422,175 A * | 6/1995 | Ito et al. | 428/304.4 |
| 5,424,121 A * | 6/1995 | Murakami et al. | 428/337 |
| 5,672,409 A * | 9/1997 | Miyakawa et al. | 428/141 |
| 5,886,088 A * | 3/1999 | Matsumoto et al. | 524/539 |
| 5,904,976 A * | 5/1999 | Berry et al. | 428/212 |
| 6,048,606 A * | 4/2000 | Bourdelais et al. | 428/304.4 |
| 6,143,408 A * | 11/2000 | Fujita | 428/355 R |
| 6,365,659 B1* | 4/2002 | Aoyama et al. | 524/399 |
| 6,423,396 B2* | 7/2002 | Hashimoto | 428/141 |
| 6,436,219 B1* | 8/2002 | Francis et al. | 156/244.11 |
| 6,582,783 B2* | 6/2003 | Hiraishi et al. | 428/1.1 |
| 6,699,545 B2* | 3/2004 | Parthasarathy | 428/35.7 |
| 6,733,873 B2* | 5/2004 | Mizutani et al. | 428/216 |
| 6,839,171 B2* | 1/2005 | Mizutani et al. | 359/490 |
| 6,841,222 B2* | 1/2005 | Murschall et al. | 428/141 |
| 6,869,991 B2* | 3/2005 | Murschall et al. | 524/91 |
| 6,914,719 B2* | 7/2005 | Koyama et al. | 359/361 |
| 6,953,768 B2* | 10/2005 | Wallace et al. | 502/242 |
| 6,984,322 B2* | 1/2006 | Suh et al. | 210/502.1 |
| 7,041,344 B2* | 5/2006 | Kusume et al. | 428/1.1 |
| 7,132,383 B2* | 11/2006 | Nakajima et al. | 502/150 |
| 7,144,614 B2* | 12/2006 | Nakajima et al. | 428/35.7 |
| 7,153,811 B2* | 12/2006 | Wallace et al. | 502/349 |
| 7,166,338 B2* | 1/2007 | Koyama et al. | 428/1.1 |
| 7,199,212 B2* | 4/2007 | Nakajima et al. | 528/282 |
| 7,208,565 B1* | 4/2007 | Nakajima et al. | 528/282 |
| 7,261,934 B2* | 8/2007 | Kusume et al. | 428/212 |
| 7,273,640 B2* | 9/2007 | Laney et al. | 428/1.1 |
| 7,327,415 B2* | 2/2008 | Brickey et al. | 349/64 |
| 7,608,349 B2* | 10/2009 | Ono et al. | 428/847.2 |
| 7,709,594 B2* | 5/2010 | Sakamoto et al. | 528/279 |
| 2001/0036545 A1* | 11/2001 | Nishi et al. | 428/315.7 |
| 2001/0036546 A1* | 11/2001 | Kaytor et al. | 428/316.6 |
| 2002/0146518 A1* | 10/2002 | Kusume et al. | 428/1.33 |
| 2003/0068512 A1* | 4/2003 | Takahashi et al. | 428/480 |
| 2004/0028925 A1* | 2/2004 | Kusume et al. | 428/480 |
| 2009/0034235 A1* | 2/2009 | Kusume et al. | 362/97.2 |

FOREIGN PATENT DOCUMENTS

| | | |
|---|---|---|
| JP | 6362104 | 3/1988 |
| JP | 63137927 | 6/1988 |
| JP | 63235338 | 9/1988 |
| JP | 04239540 | 8/1992 |
| JP | 2001-232737 A | 8/2001 |
| JP | 2001232737 | 8/2001 |
| JP | 2002-249564 * | 9/2002 |
| JP | 2002-249564 A | 9/2002 |
| JP | 2002249564 | 9/2002 |
| JP | 2004-50479 A | 2/2004 |
| JP | 2004050479 | 2/2004 |
| JP | 2004-099659 * | 4/2004 |

* cited by examiner

Primary Examiner — Vivian Chen
(74) Attorney, Agent, or Firm — Sughrue Mion, PLLC

(57) ABSTRACT

A laminated film for a reflecting plate is provided that comprises a layer A and a layer B, the layer A comprising a polyester that comprises substantially no antimony element and preferably comprises 1 to 25 wt % of inert particles having an average particle diameter of 0.3 to 3.0 μm and the layer B being in contact with the layer A and comprising a polyester which preferably comprises 31 to 80 wt % of inert particles having an average particle diameter of 0.3 to 3.0 μm. This laminated film has a practically satisfactory capability of reflecting visible light, can be produced stably even if inert particles are added in high concentration, hardly has streak-like defects, and can be suitably used as a substrate for a reflecting plate for a liquid crystal display or an internally illuminating electrical billboard.

8 Claims, No Drawings

LAMINATED FILM FOR REFLECTION PLATE

TECHNICAL FIELD

This invention relates to a laminated film for a reflecting plate. More specifically, it relates to a laminated film that has high reflectivity and hardly has film defects.

BACKGROUND ART

Liquid crystal displays have adopted a backlighting system which lights the display from the back side thereof. However, in recent years, such a sidelighting system as described in Japanese Patent Laid-Open Publication No. 63-62104 has been widely used due to an advantage that the display can be made thin and can be lit uniformly. This sidelighting system is a system that applies light to the display from cold-cathode tubes or the like from the edge of an acrylic plate or the like having certain thickness, and due to dot printing, illuminating light is dispersed uniformly, resulting in a screen having uniform brightness. This system has an advantage of making the liquid crystal display thinner than the backlighting system because it places light sources not on the back side but on the edge of the screen. However, a reflecting plate needs to be placed on the back side of the screen to prevent illuminating light from escaping to the back side of the screen. Accordingly, the reflecting plate is required to have high light reflectivity and high light diffusibility.

As a method for obtaining a polyester film suited for a liquid crystal display reflecting plate which meets this purpose, a method of incorporating an incompatible resin is described in Japanese Patent Publication No. 8-16175. Although this method is a method which can produce the above film at relatively low cost, it is unsatisfactory in terms of an improvement in reflectivity since it merely adds the incompatible resin, and the brightness of the screen of a produced liquid crystal display is also unsatisfactory. Further, when inert particles such as titanium oxide are added in high concentration, an improvement in reflectivity can be expected. However, when the inert particles are added in an amount of, for example, 50 wt %, the concentration of the inert particles is so high that ruptures often occur and film formation is very difficult. Accordingly, a white polyester film which achieves a good balance between an improvement in reflectivity and ease of film formation has been needed.

Further, for conventional white polyester films, antimony trioxide has been widely used as a catalyst as described in Japanese Patent Laid-Open Publication Nos. 63-137927 and 63-235338. Antimony oxide is liable to be deposited on a die when a molten polyester resin is extruded from the die, and the deposited antimony oxide is liable to produce streak-like defects on the molten resin. In particular, in the case of white polyester films, the streak-like defects are easily observed as black streak-like defects. Therefore, measures therefor have been desired.

DISCLOSURE OF THE INVENTION

An object of the present invention is to provide a laminated film for a reflecting plate which has a practically satisfactory capability of reflecting visible light, can be produced stably even if inert particles are added in high concentration and hardly has streak-like defects thereon.

Another object of the present invention is to provide a white laminated film that can be suitably used as a substrate for a reflecting plate for a liquid crystal display or an internally illuminating electrical billboard.

Other objects and advantages of the present invention will become apparent from the following description.

According to the present invention, firstly, the above objects and advantages of the present invention are achieved by a laminated film for a reflecting plate, which comprises at least two layers one of which is a surface layer comprising an aromatic polyester which substantially contains no antimony element.

According to the present invention, secondly, the above objects and advantages of the present invention are achieved by a reflecting plate comprising the above laminated film.
Preferred Embodiments of the Invention The laminated film of the present invention comprises at least two layers. One of the layers is a surface layer, and the surface layer comprises an aromatic polyester which substantially contains no antimony element. Hereinafter, the surface layer will be referred to as "layer A", and the other layer of the two layers will be referred to as "layer B" for the purpose of simplifying the following description.

The aromatic polyester used in the layers A and B comprises an aromatic dicarboxylic acid component and a diol component as main components. Illustrative examples of the aromatic dicarboxylic acid include terephthalic acid, isophthalic acid, 2,6-naphthalenedicarboxylic acid, and 4,4'-diphenyldicarboxylic acid. Illustrative examples of the diol include ethylene glycol, 1,4-butanediol, 1,4-cyclohexane dimethanol, and 1,6-hexanediol.

The aromatic polyester may be a homopolymer or a copolymer. When it is a copolymer, an aliphatic dicarboxylic acid as a dicarboxylic acid component can be used as a copolymerizable component. Illustrative examples of the aliphatic dicarboxylic acid include adipic acid and sebacic acid. The aromatic polyester is preferably a homopolymer, that is, polyethylene terephthalate, or copolymer comprising ethylene terephthalate as a main recurring unit. In the case of the copolymer, the proportion of the copolymerizable component is preferably 1 to 30 mol %, more preferably 3 to 25 mol %, much more preferably 5 to 20 mol %, particularly preferably 7 to 15 mol % of all dicarboxylic acid components. When the proportion is lower than 1 mol %, a layer containing inert particles, e.g. a layer containing at least 31 wt % of inert particles, cannot be formed disadvantageously, while when the proportion is higher than 30 mol %, a film having unsatisfactory thermal and dimensional stability is obtained or even film formation may not be achieved disadvantageously.

Of the layers A and B, the polyester used in at least the layer A must contain substantially no antimony element. Accordingly, polymerization of the polyester is conducted without using an antimony compound as a catalyst. As a catalyst used in polymerization of the polyester, any of a manganese (Mn) compound, a titanium (Ti) compound and a germanium (Ge) compound is preferably used, for example. Specific examples of the titanium compound include titanium tetrabutoxide and titanium acetate. Specific examples of the germanium compound include 1) amorphous germanium oxide, 2) fine crystalline germanium oxide, 3) a solution prepared by dissolving germanium oxide in glycol in the presence of alkali metal or alkaline earth metal or a compound thereof, and 4) a solution prepared by dissolving germanium oxide in water. A method using these germanium compounds as a catalyst is known as a method of polymerizing a polyester and is suitable as a method of producing the polyester that is used in the present invention. The polyester used in the layer B can also be produced by the same method.

The phrase "containing substantially no antimony element" indicates that the content of antimony element is 20 ppm or lower, preferably 15 ppm or lower, more preferably 10 ppm or lower.

The melting point of the polyester of the layer B is preferably 220 to 250° C. By use of a polyester whose melting point falls within this range, a film which can be produced stably even if inert particles are added in high concentration can be obtained.

The polyesters used in the layers A and B may contain various known additives such as an antioxidant, antistatic agent, fluorescent brightener and ultraviolet absorber.

Inert Particles

The polyester of the layer A in the present invention preferably contains 1 to 25 wt % of inert particles having an average particle diameter of 0.3 to 3.0 μm. The polyester of the layer B preferably contains 31 to 80 wt % of inert particles having an average particle diameter of 0.3 to 3.0 μm. The average particle diameter of the inert particles contained in the layers A and B is 0.3 to 3.0 μm, preferably 0.5 to 2.5 μm, more preferably 0.7 to 2.0 μm. When the average particle diameter is smaller than 0.3 μm, dispersibility deteriorates considerably and agglomeration of the particles occurs. Consequently, troubles in a production process are liable to occur, possibly resulting in a film having coarse projections and poor gloss. Meanwhile, when the average particle diameter is larger than 3.0 μm, the surfaces of the film becomes rough, resulting in degradation in gloss, and it becomes difficult to control glossiness to a proper range. Further, the half width of the particle size distribution of the inert particles is preferably 0.3 to 3.0 μm, more preferably 0.3 to 2.5 μm.

Further, the content of the above inert particles in the layer A is more preferably 2 to 23 wt %, particularly preferably 3 to 20 wt %. Likewise, the content of the above inert particles in the layer B is more preferably 33 to 70 wt %, particularly preferably 35 to 55 wt %.

Further, the proportion of the inert particles to the total weight of the layers A and B is preferably 10 to 80 wt %, more preferably 15 to 70 wt %, much more preferably 20 to 60 wt %, particularly preferably 25 to 55 wt %. When the content of the inert particles in the film is lower than 10 wt %, required reflectivity and whiteness cannot be obtained, while when the content of the inert particles is higher than 80 wt %, ruptures are liable to occur during film formation disadvantageously.

As the inert particles, inorganic particles or organic particles can be used. Illustrative examples of the organic particles include a cross-linked polystyrene resin and a cross-linked acrylic resin. Illustrative examples of the inorganic particles include titanium oxide, barium sulfate, calcium carbonate and silicon dioxide. These inorganic particles are so-called white pigments and are preferably used to improve a reflective performance. Of these, barium sulfate is particularly preferred from the viewpoint of obtaining excellent reflectivity. Barium sulfate may be plate-like particles or spherical particles.

When titanium oxide is used, rutile-type titanium oxide is preferably used because yellowing of the polyester film after the film is irradiated with light for a long time is less severe with the rutile-type titanium oxide than with anatase-type titanium oxide and a change in color difference can be controlled. The rutile-type titanium oxide is preferably treated with a fatty acid such as stearic acid or a derivative thereof before use to improve dispersibility because the glossiness of the film can be further improved.

When the rutile-type titanium oxide is used, it is preferably subjected to adjustment of particle size and removal of coarse particles by use of a purification process before added to the polyester. As for industrial means for conducting the purification process, for example, a jet mill or a ball mill can be used as crushing means, and dry or wet centrifugal separation can be used as classification means. These means may be used in combination of two or more to purify the titanium oxide stepwise.

Inert particles of one type may be used alone or inert particles of two or more types may be used in combination.

To have the inert particles contained in the polyester, it is preferred to use any of the following methods, i.e. (a) a method of adding the inert particles before the completion of a transesterification reaction or esterification reaction or before the start of a polycondensation reaction during synthesis of the polyester, (b) a method comprising adding the inert particles to the polyester and melt-kneading them, (c) a method comprising producing master pellets by adding a large amount of the inert particles by the above method (a) or (b) and mixing the master pellets with a polyester containing no additive to have a predetermined amount of the additive contained in the polyester, and (d) a method of using the master pellets produced in the above (c) as they are.

When titanium oxide is added by use of the above method (a) of adding it during synthesis of the polyester, it is preferably added to the reaction system as slurry having the titanium oxide dispersed in glycol.

It is particularly preferred to use the above method (c) or (d).

In the present invention, it is preferred to filter a molten polymer by use of a nonwoven fabric filter made of stainless steel wires having a wire diameter of not larger than 15 μm and having an average opening size of 10 to 100 μm, preferably 20 to 50 μm, as a filter before film formation, i.e. before the molten polymer is discharged from the slit to form a film. By carrying out this filtration, agglomeration of particles which are generally liable to form coarse agglomerated particles is inhibited, and a film having few coarse foreign matters can be obtained.

Additives

The polyesters constituting the layers A and B may contain, as additives, aluminum oxide, magnesium oxide, organic fillers such as an acrylic resin, an urea resin and a melamine resin, other resins such as polyethylene, polypropylene, an ethylene-propylene terpolymer and an olefinic ionomer, an antioxidant, an ultraviolet absorber and a fluorescent brightener as required in amounts that do not deviate from the scope of the present invention.

The fluorescent brightener is preferably added in an amount of 0.005 to 0.2 wt %, more preferably 0.01 to 0.1 wt %, based on the polyester composition. When the amount of the florescent brightener is smaller than 0.01 wt %, reflectivity at wavelengths of around 350 nm is not satisfactory, and a reflecting plate with unsatisfactory illuminance is obtained disadvantageously. Meanwhile, when the amount is larger than 0.2 wt %, the color of the fluorescent brightener appears disadvantageously. As the florescent brightener, OB-1 (product of Eastman Co.), Uvitex-MD (product of Ciba-Geigy Co., Ltd.) or JP-Conc (product of Nippon Chemical Industrial Co., Ltd.) can be used, for example. Further, a coating agent containing an antioxidant, an ultraviolet absorber, a fluorescent brightener and the like may be applied to at least one surface of the present film as required.

Film Production

The laminated film of the present invention comprises at least the layer A and the layer B and may also comprise other layers. The layers A and B exist in contact with each other. The laminated film of the present invention may take, for instance, a two-layer structure of layer A/layer B, a three-layer structure of layer A/layer B/layer A or a four-layer structure of layer A/layer B/layer A/layer B. Alternatively, the laminated film may take a structure comprising 5 or more layers including the above structures.

In view of ease and effects in film production, the two-layer structure or the three-layer structure of layer A/layer B/layer A is particularly preferred. Further, other layers may be laminated on one or both surfaces of the film to impart other functions. As the other layers, a transparent polyester resin layer, a thin metal film, a hard-coating layer and an ink absorbing layer can be used, for example.

The thickness of the layer A is preferably 6 to 60 μm, more preferably 5 to 50 μm. Meanwhile, the thickness of the layer B is preferably 30 to 230 μm, more preferably 40 to 220 μm. Further, the ratio of the thickness of the layer A to the thickness of the layer B is preferably 1/20 to 1/2, more preferably 1/18 to 2/5.

Next, an example of a method for producing the laminated film of the present invention will be described. Molten polymers are extruded from dies by a simultaneous multilayer extrusion method using a feed block to produce an unstretched laminated sheet. That is, a molten polymer which forms the layer A and a molten polymer which forms the layer B are laminated in the form of, for example, layer A/layer B/layer A by use of a feed block and extruded from dies. At that time, the polymers laminated in the feed block retain the laminated form.

The unstretched sheet extruded from the dies are cooled and solidified by a casting drum to form an unstretched film. This unstretched film is heated by roll heating, infrared heating or the like and stretched in the longitudinal direction to obtain the longitudinally stretched film. This stretching is preferably carried out by use of the difference in circumferential speed between two or more rolls. The stretch temperature is equal to or higher than the glass transition point (Tg) of the polyester, preferably Tg to (Tg+70)° C. Although varying depending on required properties of application, the stretch ratios in the longitudinal direction and the direction perpendicular to the longitudinal direction (hereinafter referred to as "transverse direction") are preferably 2.5 to 4.0 times, more preferably 2.8 to 3.9 times. When the stretch ratios are smaller than 2.5 times, nonuniformity in the thickness of the film becomes worse and a good film cannot be obtained, while when the stretch ratios are larger than 4.0 times, ruptures are liable to occur during film production disadvantageously.

The longitudinally stretched film is then subjected to transverse stretching, heat-setting and heat relaxation sequentially to obtain a biaxially oriented film. These treatments are carried out with the film running. The transverse stretching is started from a temperature higher than the glass transition point (Tg) of the polyester and carried out while the temperature is elevated to a temperature higher than Tg by 5 to 70° C. The elevation of the temperature in the transverse stretching process may be continuous or stepwise (sequential) but is generally sequential. For example, the transverse stretching zone of a tenter is divided into a plurality of zones along the film running direction and a heating medium of given temperature is flown in each zone to elevate the temperature. Although varying depending on required properties of application, the transverse stretching ratio is preferably 2.5 to 4.5 times, more preferably 2.8 to 3.9 times. When the stretch ratio is smaller than 2.5 times, nonuniformity in the thickness of the film becomes worse and a good film cannot be obtained, while when the stretch ratio is larger than 4.5 times, ruptures are liable to occur during film production.

When the melting point of the polyester is Tm(° C.), the transversely stretched film is preferably heat-treated at (Tm−20 to 100)° C. at a constant width or a reduction in width of not higher than 10% with both ends of the film held to reduce heat shrinkage. When the heat treatment temperature is higher than the above range, the flatness of the film deteriorates and nonuniformity in thickness becomes great disadvantageously. Meanwhile, when the heat treatment temperature is lower than (Tm−80)° C., heat shrinkage may increase. Further, to adjust heat shrinkage in a range of lower than (Tm−20 to 100)° C., it is possible to cut off the held ends of the film and adjust the take-over speed in the longitudinal direction of the film so as to relax the film in the longitudinal direction while the heat-set film is allowed to cool to room temperature. Speed of rolls at the exporting side of the tenter is controlled as means of relaxation. As for the relaxation ratio, the speed of rolls is slowed down with respect to the film line speed of the tenter, and a slowdown or relaxation (hereinafter referred to as "relaxation ratio") of preferably 0.1 to 1.5% is conducted. A relaxation ratio of more preferably 0.2 to 1.2%, much more preferably 0.3 to 1.0%, is conducted to adjust heat shrinkage in the longitudinal direction. As for the transverse direction of the film, desired heat shrinkage can be obtained by decreasing the width by the time when both ends are cut off.

The thus obtained laminated film of the present invention may have a heat shrinkage at 85° C. in the two directions perpendicular to each other of 0.7% or lower, more preferably 0.6% or lower, most preferably 0.5% or lower. The thickness of the biaxially stretched film is preferably 25 to 250 μm, more preferably 30 to 220 μm, much more preferably 40 to 200 μm. When the thickness is 25 μm or smaller, reflectivity lowers, while when it is larger than 250 μm, an improvement in reflectivity cannot be expected disadvantageously.

The laminated film of the present invention can be suitably used for a reflecting plate, e.g. a reflecting plate for a liquid crystal display.

As described above, according to the present invention, a white laminated film can be provided that has a practically satisfactory capability of reflecting visible light, can be produced stably even if inert particles are added in high concentration and hardly has streak-like defects on the surfaces of the film. This laminated film can be suitably used as a substrate for a reflecting plate for a liquid crystal display or an internally illuminating electrical billboard.

EXAMPLES

Hereinafter, the present invention will be further described by use of Examples. Property values were measured in the following manner.
(1) Film Thickness The thickness of film sample was measured at 10 points by means of an electric micrometer (K-402B of Anritsu Corporation), and the average was taken as the thickness of the film.
(2) Thickness of Each Layer A sample was cut out in a triangular shape, fixed to an embedding capsule and then embedded in an epoxy resin. Then, a cross section parallel to the longitudinal direction of the embedded sample and having a thickness of 50 nm was cut out of the embedded sample by means of a microtome (UL-TRACUT-S) and observed and photographed at an accelerating voltage of 100 kv by use of a transmission electron microscope. The thickness of each layer was measured from the photograph, and the average thickness was determined.
(3) Reflectivity An integrating sphere was attached to a spectrophotometer (UV-3101PC of Shimadzu Corporation), and reflectivity when a $BaSO_4$ white plate was 100% was measured over 400 to 700 nm. Reflectivity was read from the obtained chart at an interval of 2 nm. The average was determined within the above range and rated based on the following criteria.

○: Reflectivity is 90% or higher in all measured range.

Δ: The average reflectivity is 90% or higher in the measured range, and reflectivity is lower than 90% at some wavelengths.

X: The average reflectivity is lower than 90% in all measured range.

(4) Stretchability

A film was stretched at a longitudinal stretch ratio of 2.9 to 3.4 times and a transverse stretch ratio of 3.5 to 3.7 times to be formed and it was observed whether the film could be produced stably. The result was evaluated based on the following criteria.

○: A film can be produced stably for 1 hour or longer.

X: Ruptures occur within 1 hour, and stable film production is not possible.

(5) Heat Shrinkage

A film was kept in an oven set at 85° C. in an atonic state for 30 minutes, the distance between gage marks was measured before and after a heat treatment, and heat shrinkage (heat shrinkage at 85° C.) was calculated from the following formula.

Heat Shrinkage (%)=((*L*0−*L*)/*L*0)×100

L0: Distance between gage marks before heat treatment
L: Distance between gage marks after heat treatment (6) Glass Transition Point (Tg) and Melting Point (Tm)

These were measured at a temperature increasing rate of 20 m/min by use of a differential scanning calorimeter (TA Instruments 2100 DSC).

(7) Observation of Film Defects

A biaxially stretched film having a size of 20 cm×20 cm was visually observed under a halogen lamp at a distance of about 30 cm and an angle of 45° from the film surface.

X: Black streaks are observed.
○: Black streaks are not observed.

(8) Assay of Metal Element

A film was melt-molded at 240° C. to prepare a plate having a diameter of 5 cm and a thickness of 3 mm, and the plate was measured by a fluorescent X-ray (SEA1000 of SII). "Containing substantially no antimony (Sb) element" indicates lower than the detection limit (e.g. 0 ppm) in the present measurement.

Examples 1 to 4

132 parts by weight of dimethyl terephthalate, 18 parts by weight of dimethyl isophthalate (12 mol % based on the acid component of polyester), 96 parts by weight of ethylene glycol, 3.0 parts by weight of diethylene glycol, 0.05 parts by weight of manganese acetate and 0.012 parts by weight of lithium acetate were charged into a flask equipped with a rectifying column and a distillation condenser, heated to 150 to 235° C. under agitation to distill methanol out so as to carry out a transesterification reaction. After methanol was distilled out, 0.03 parts by weight of trimethyl phosphate and 0.04 parts by weight of germanium dioxide were added, and the reactants were transferred to a reactor. Then, while the contents of the reactor were agitated, the pressure inside the reactor was gradually reduced to 0.5 mmHg and the temperature inside the reactor was increased to 290° C. to carry out a polycondensation reaction. The obtained copolyester showed an intrinsic viscosity of 0.70 dl/g, a melting point of 224° C., a diethylene glycol content of 2.5 wt %, a germanium element content of 50 ppm and a lithium element content of 5 ppm. To this polyester resin, inert particles shown in Table 1 were added. Then, the resin was fed to two extruders heated to 280° C., and the layer A polymer and the layer B polymer were combined by use of a three-layer feed block so that a structure of layer A/layer B/layer A was obtained, and the polymers were molded into a sheet from a die while the laminated form was retained. Then, this sheet was cooled and solidified by a cooling drum having a surface temperature of 25° C. to obtain an unstretched film, and the unstretched film was then heated at a shown temperature, stretched in a longitudinal direction and cooled by rolls of 25° C. Then, the longitudinally stretched film was led to a tenter with both ends thereof held by clips and stretched in the direction (transverse direction) perpendicular to the longitudinal direction in an atmosphere heated to 120° C. Thereafter, the stretched film was heat-set in the tenter at a temperature shown in Table 2, subjected to relaxation in the longitudinal direction and side adjustment in the transverse direction at temperatures shown in Table 2, and then cooled to room temperature to obtain a biaxially stretched film. The physical properties of the obtained films as a substrate for a reflecting plate are as shown in Table 2.

Examples 5 to 13

A copolyester was obtained in the same manner as in Examples 1 to 4 except that 0.05 parts by weight of manganese acetate was changed to 0.02 parts by weight of titanium acetate. The obtained copolyester showed an intrinsic viscosity of 0.68 dl/g, a melting point of 225° C., a diethylene glycol content of 2.5 wt %, a titanium element content of 15 ppm and a lithium element content of 5 ppm. To this polyester resin, inert particles shown in Table 1 were added, and films were prepared as shown in Table 2.

Comparative Example 1

After 85 parts by weight of dimethyl terephthalate and 60 parts by weight of ethylene glycol were subjected to a transesterification reaction in the usual manner by use of 0.09 parts by weight of calcium acetate as a catalyst, an ethylene glycol solution containing 10 wt % of trimethyl phosphate was added as a phosphorus compound in an amount of 0.18 wt % based on a polymer, and 0.03 parts by weight of antimony trioxide was then added as a polymerization catalyst. Then, a polycondensation reaction was carried out at high temperature and under reduced pressure in the usual manner to obtain a polyethylene terephthalate having a limiting viscosity of 0.60. This copolyester had an intrinsic viscosity of 0.65 dl/g, a melting point of 257° C., a diethylene glycol content of 1.2 wt %, an antimony element content of 30 ppm and a calcium element content of 10 ppm. To this resin, inert particles shown in Table 1 were added to form layers A and B. A film was prepared under conditions shown in Table 2.

Comparative Example 2

A film was prepared in the same manner as in Comparative Example 1 except that conditions shown in Tables 1 and 2 were used.

Comparative Examples 3 and 4

Films were prepared in the same manner as in Comparative Example 1 except that conditions shown in Tables 1 and 2 were used. Since stretchability was extremely low and ruptures often occurred during film production, film samples could not be prepared.

Comparative Examples 5 and 6

A copolyester resin was obtained in the same manner as in Examples 1 to 4 except that 0.04 parts by weight of germanium dioxide was changed to 0.04 parts by weight of antimony trioxide. The copolyester resin had an antimony element content of 40 ppm. By use of this resin, films were prepared as shown in Tables 1 and 2.

Comparative Example 7

By use of the resin of Comparative Example 1, 14 wt % of calcium carbonate as inorganic fine particles was added as surface layers (front face and rear face) of a three-layer film, and 10 wt % of polymethylpentene resin that was an incompatible resin and 1 wt % of polyethylene glycol were mixed into polyethylene terephthalate as the resin of the core layer to prepare a film. As shown in Tables 1 and 2, streaks were noticeable and reflectivity was poor.

TABLE 1

| | Polyester Resin of Layer A | | | | | | | |
|---|---|---|---|---|---|---|---|---|
| | Type of Resin | Copolymerizable Component | % of Copolymerization | Inert Particles | Amount of Inert Particles/Average Particle Diameter (wt %/μm) | Tg | Tm | Sb Element |
| Ex. 1 | PET | IPA | 12 | Barium Sulfate | 5.0/1.2 | 74 | 225 | 0 |
| Ex. 2 | PET | IPA | 12 | Barium Sulfate | 10.0/1.2 | 74 | 225 | 0 |
| Ex. 3 | PET | IPA | 12 | Titanium Dioxide | 5.0/1.0 | 75 | 225 | 0 |
| Ex. 4 | PET | IPA | 12 | Titanium Dioxide | 4.0/0.3 | 74 | 224 | 0 |
| Ex. 5 | PET | IPA | 12 | Barium Sulfate | 3.0/0.7 | 74 | 225 | 0 |
| Ex. 6 | PET | IPA | 12 | Barium Sulfate | 20.0/1.2 | 74 | 223 | 0 |
| Ex. 7 | PET | IPA | 12 | Barium Sulfate | 4.0/1.2 | 74 | 225 | 0 |
| Ex. 8 | PET | IPA | 12 | Calcium Carbonate | 7.5/1.5 | 75 | 224 | 0 |
| Ex. 9 | PET | IPA | 7 | Silicon Dioxide (Complete Spheres) | 5.0/1.2 | 76 | 239 | 0 |
| Ex. 10 | PET | NDC | 12 | Barium Sulfate | 25/0.6 | 81 | 223 | 0 |
| Ex. 11 | PET | IPA | 15 | Silicone (Spherical) | 5.0/1.2 | 71 | 220 | 0 |
| Ex. 12 | PET | CHDM | 3 | Calcium Carbonate | 15/2.5 | 78 | 243 | 0 |
| Ex. 13 | PET | NDC | 6 | Calcium Carbonate | 2/1.0 | 79 | 240 | 0 |
| C. Ex. 1 | PET | — | — | Barium Sulfate | 5.0/1.5 | 80 | 257 | 30 |
| C. Ex. 2 | PET | — | — | Titanium Dioxide | 3.0/0.3 | 79 | 257 | 30 |
| C. Ex. 3 | PET | — | — | Titanium Dioxide | 7.5/1.5 | 80 | 257 | 30 |
| C. Ex. 4 | PET | — | — | Titanium Dioxide | 7.5/1.5 | 79 | 256 | 30 |
| C. Ex. 5 | PET | IPA | 12 | Barium Sulfate | 15.0/1.2 | 75 | 224 | 40 |
| C. Ex. 6 | PET | IPA | 12 | Barium Sulfate | 3.0/1.2 | 74 | 225 | 40 |
| C. Ex. 7 | PET | — | — | Calcium Carbonate | 14/1.5 | 78 | 255 | 30 |

| | Polyester Resin of Layer B | | | | | | | Total Content Of Inert Particles (wt %) |
|---|---|---|---|---|---|---|---|---|---|
| | Type of Resin | Copolymerizable Component | % of Copolymerization | Inert Particles | Amount/Average Particle Diameter (wt %/μm) | Tg | Tm | Layer Structure Thickness Ratio | |
| Ex. 1 | PET | IPA | 12 | Barium Sulfate | 50/1.2 | 74 | 225 | A/B/A = 15/70/15 | 36.5 |
| Ex. 2 | PET | IPA | 12 | Barium Sulfate | 45/1.2 | 74 | 225 | A/B/A = 10/80/10 | 38.0 |
| Ex. 3 | PET | IPA | 12 | Titanium Dioxide | 50/1.0 | 75 | 225 | A/B/A = 20/60/20 | 32.0 |
| Ex. 4 | PET | IPA | 12 | Titanium Dioxide | 55/0.3 | 74 | 224 | A/B/A = 12/76/12 | 42.8 |
| Ex. 5 | PET | IPA | 12 | Barium Sulfate | 50/0.7 | 74 | 225 | A/B/A = 12/76/12 | 38.7 |
| Ex. 6 | PET | IPA | 12 | Barium Sulfate | 55/1.2 | 74 | 223 | A/B/A = 15/70/15 | 44.5 |
| Ex. 7 | PET | IPA | 12 | Barium Sulfate | 51/1.2 | 74 | 225 | A/B/A = 15/70/15 | 36.9 |
| Ex. 8 | PET | IPA | 12 | Titanium Dioxide | 35/1.5 | 75 | 224 | A/B/A = 15/70/15 | 26.8 |
| Ex. 9 | PET | IPA | 7 | Silicon Dioxide (Complete Spheres) | 55/1.5 | 76 | 239 | A/B/A = 7/86/7 | 48.0 |
| Ex. 10 | PET | NDC | 12 | Barium Sulfate | 40/1.2 | 81 | 223 | A/B/A = 8/84/8 | 37.6 |
| Ex. 11 | PET | IPA | 15 | Titanium Dioxide | 35/0.5 | 71 | 220 | A/B/A = 10/80/10 | 29.0 |
| Ex. 12 | PET | CHDM | 3 | Calcium Carbonate | 35/2.5 | 78 | 243 | A/B/A = 12/76/12 | 30.2 |
| Ex. 13 | PET | NDC | 6 | Calcium Carbonate | 30/1.2 | 79 | 240 | A/B/A = 6/88/6 | 26.6 |
| C. Ex. 1 | PET | — | — | Barium Sulfate | 20/1.5 | 80 | 257 | A/B/A = 15/70/15 | 15.5 |
| C. Ex. 2 | PET | — | — | Titanium Dioxide | 20/0.3 | 79 | 257 | A/B/A = 15/70/15 | 14.9 |
| C. Ex. 3 | PET | — | — | Titanium Dioxide | 30/1.5 | 80 | 256 | A/B/A = 15/70/15 | 23.3 |
| C. Ex. 4 | PET | — | — | Titanium Dioxide | 50/1.5 | 79 | 257 | A/B/A = 15/70/15 | 37.3 |
| C. Ex. 5 | PET | IPA | 12 | Barium Sulfate | 51/1.2 | 75 | 224 | A/B/A = 15/70/15 | 40.2 |
| C. Ex. 6 | PET | IPA | 12 | Barium Sulfate | 45/1.2 | 74 | 225 | A/B/A = 12/76/12 | 34.9 |

TABLE 1-continued

| | | | | | | | | |
|---|---|---|---|---|---|---|---|---|
| C. Ex. 7 | PET | — | — | — | (PMX Resin Added) | 77 | 253 | A/B/A = 6/88/6 | 1.7 |

Ex.: Example,
C. Ex.: Comparative Example
PET: Polyethylene Terephthalate,
IPA: Isophthalic Acid,
NDC: 2,6-naphthalenedicarboxylic acid
In the above table, the amount of inert particles is the proportion (wt %) of the inert particles to the total weight of polyester and the inert particles.
CHDM: Cyclohexane Dimethanol,
PMX: Polymethylpentene

TABLE 2

| | Longitudinal Stretch Ratio | Longitudinal Stretch Temperature (° C.) | Transverse Stretch Ratio | Transverse Stretch Temperature (° C.) | Heat Setting Temperature (° C.) | Relaxation Ratio/ Temperature for Cutting Both Ends (° C.) | Toe-in rate (Relaxationrate in transverse direction) (%) | Temperature of the Toe-in rate (° C.) |
|---|---|---|---|---|---|---|---|---|
| Ex. 1 | 2.9 | 95 | 3.7 | 120 | 210 | 0.5/130 | 2 | 150 |
| Ex. 2 | 2.9 | 95 | 3.7 | 120 | 210 | 0.5/130 | 2 | 150 |
| Ex. 3 | 3.4 | 90 | 3.7 | 120 | 210 | 0.4/120 | 1 | 130 |
| Ex. 4 | 2.9 | 90 | 3.5 | 120 | 210 | 0.7/150 | 3 | 130 |
| Ex. 5 | 2.9 | 95 | 3.7 | 120 | 210 | 0.5/150 | 3 | 150 |
| Ex. 6 | 2.9 | 90 | 3.7 | 120 | 210 | 1.0/150 | — | — |
| Ex. 7 | 2.9 | 90 | 3.7 | 120 | 210 | 0.5/120 | 3 | 150 |
| Ex. 8 | 2.9 | 95 | 3.7 | 120 | 210 | 0.5/130 | 2 | 150 |
| Ex. 9 | 3.0 | 90 | 3.8 | 125 | 200 | 0.5/115 | 2 | 120 |
| Ex. 10 | 2.8 | 95 | 3.7 | 125 | 200 | 0.6/120 | 2 | 130 |
| Ex. 11 | 2.9 | 85 | 3.9 | 115 | 190 | 0.7/140 | 1 | 140 |
| Ex. 12 | 3.0 | 95 | 3.7 | 120 | 205 | 0.5/130 | 1 | 150 |
| Ex. 13 | 3.4 | 90 | 3.5 | 120 | 210 | 0.8/130 | 2 | 140 |
| C. Ex. 1 | 2.9 | 90 | 3.7 | 120 | 210 | — | — | — |
| C. Ex. 2 | 2.9 | 90 | 3.7 | 120 | 210 | 0.5/130 | 2 | 150 |
| C. Ex. 3 | 3.4 | 90 | 3.7 | 120 | 210 | 0.5/130 | 3 | 150 |
| C. Ex. 4 | 3.4 | 90 | 3.7 | 120 | 210 | 0.5/130 | 3 | 150 |
| C. Ex. 5 | 2.9 | 90 | 3.5 | 120 | 210 | 0.5/130 | 3 | 150 |
| C. Ex. 6 | 2.9 | 90 | 3.7 | 120 | 210 | 0.5/130 | 1 | 130 |
| C. Ex. 7 | 3.4 | 92 | 3.6 | 130 | 230 | — | — | — |

| | Biaxially Stretch Thickness (μm) | Evaluation of Reflectivity | Observation of Streaks | Heat Shrinkage(%) at 85 (° C.) Longitudinal | Heat Shrinkage(%) at 85 (° C.) Transverse | Stretchability |
|---|---|---|---|---|---|---|
| Ex. 1 | 150 | ○ | ○ | 0.1 | 0.1 | ○ |
| Ex. 2 | 150 | ○ | ○ | 0.1 | 0.1 | ○ |
| Ex. 3 | 100 | ○ | ○ | 0.2 | 0.2 | ○ |
| Ex. 4 | 100 | ○ | ○ | 0.1 | 0.1 | ○ |
| Ex. 5 | 170 | ○ | ○ | 0.2 | 0.1 | ○ |
| Ex. 6 | 75 | ○ | ○ | 0.1 | 0.6 | ○ |
| Ex. 7 | 50 | ○ | ○ | 0.1 | 0.1 | ○ |
| Ex. 8 | 150 | ○ | ○ | 0.1 | 0.1 | ○ |
| Ex. 9 | 188 | ○ | ○ | 0.2 | 0.1 | ○ |
| Ex. 10 | 200 | ○ | ○ | 0.1 | 0.1 | ○ |
| Ex. 11 | 188 | ○ | ○ | 0.3 | 0.2 | ○ |
| Ex. 12 | 225 | ○ | ○ | 0.3 | 0.1 | ○ |
| Ex. 13 | 200 | ○ | ○ | 0.1 | 0.1 | ○ |
| C. Ex. 1 | 150 | Δ | X | 0.8 | 0.8 | ○ |
| C. Ex. 2 | 150 | Δ | X | 0.1 | 0.1 | ○ |
| C. Ex. 3 | — | — | — | — | — | X |
| C. Ex. 4 | — | — | — | — | — | X |
| C. Ex. 5 | 100 | ○ | X | 0.2 | 0.2 | ○ |
| C. Ex. 6 | 150 | ○ | X | 0.4 | 0.3 | ○ |
| C. Ex. 7 | 50 | X | X | 0.3 | 0.3 | ○ |

Ex.: Example,
C. Ex.: Comparative Example

The invention claimed is:

1. A method for producing a laminated film, which comprises providing an unstretched laminated film which comprises at least two layers one of which is a surface layer comprising an aromatic polyester which comprises substantially no antimony element in an amount of 20 ppm or lower and the other layer other than the surface layer comprises an aromatic polyester containing 31 to 80 wt. % of inert particles having an average particle diameter of 0.3 to 3.0 μm; stretching the unstretched laminated film in the longitudinal direction and then in the transverse direction; heat-treating the obtained stretched laminated film with both ends of the film held; cutting off the held ends of the heat-set film while the film is allowed to cool to room temperature and subjecting the film to relaxation in the longitudinal direction at a relaxation ratio of 0.1 to 1.5% and a relaxation temperature of 115° C. to 150° C., wherein the laminated film is a laminated film for a reflecting plate, which comprises at least two layers one of which is a surface layer comprising an aromatic polyester which comprises substantially no antimony element in an amount of 20 ppm or lower and the other layer other than the surface layer comprises an aromatic polyester containing 31 to 80 wt % of inert particles having an average particle diameter of 0.3 to 3.0 μm, wherein said laminated film has heat shrinkages at 85° C. in the two directions of longitudinal direction and transverse direction perpendicular to each other of 0.7% or less.

2. The method of claim 1, wherein the surface layer which is one of the at least two layers comprises 1 to 25 wt % of inert particles having an average particle diameter of 0.3 to 3.0 μm.

3. The method of claim 1, wherein the aromatic polyester containing 31 to 80 wt % of inert particles having an average particle diameter of 0.3 to 3.0 μm is a copolyester having a melting point of 220 to 250° C.

4. The method of claim 1, wherein the thickness of the surface layer is 5 to 50 μm.

5. The method of claim 1, wherein the thickness of the other layer other than the surface layer is 30 to 230 μm.

6. The method of claim 1, wherein the ratio of the thickness of the surface layer/the thickness of the other layer other than the surface layer is ½₀ to ½.

7. The method of claim 1, wherein the reflecting plate is a reflecting plate for a liquid crystal display.

8. The method of claim 1, wherein the laminated film is biaxially oriented in the longitudinal direction and transverse direction at a stretch ratio of 2.5 to 4.0 times and 2.5 to 4.5 times, respectively.

* * * * *